INVENTOR
GAVIN D. JENNEY

BY Nilsson, Robbins & Anderson
ATTORNEYS

Oct. 22, 1968 G. D. JENNEY 3,406,719
SEQUENTIAL ACTIVATING VALVE FOR REDUNDANT
HYDRAERIC CONTROL SYSTEMS
Filed March 14, 1966 3 Sheets-Sheet 2

INVENTOR
GAVIN D. JENNEY
By Nelson, Robbins & Anderson
ATTORNEYS

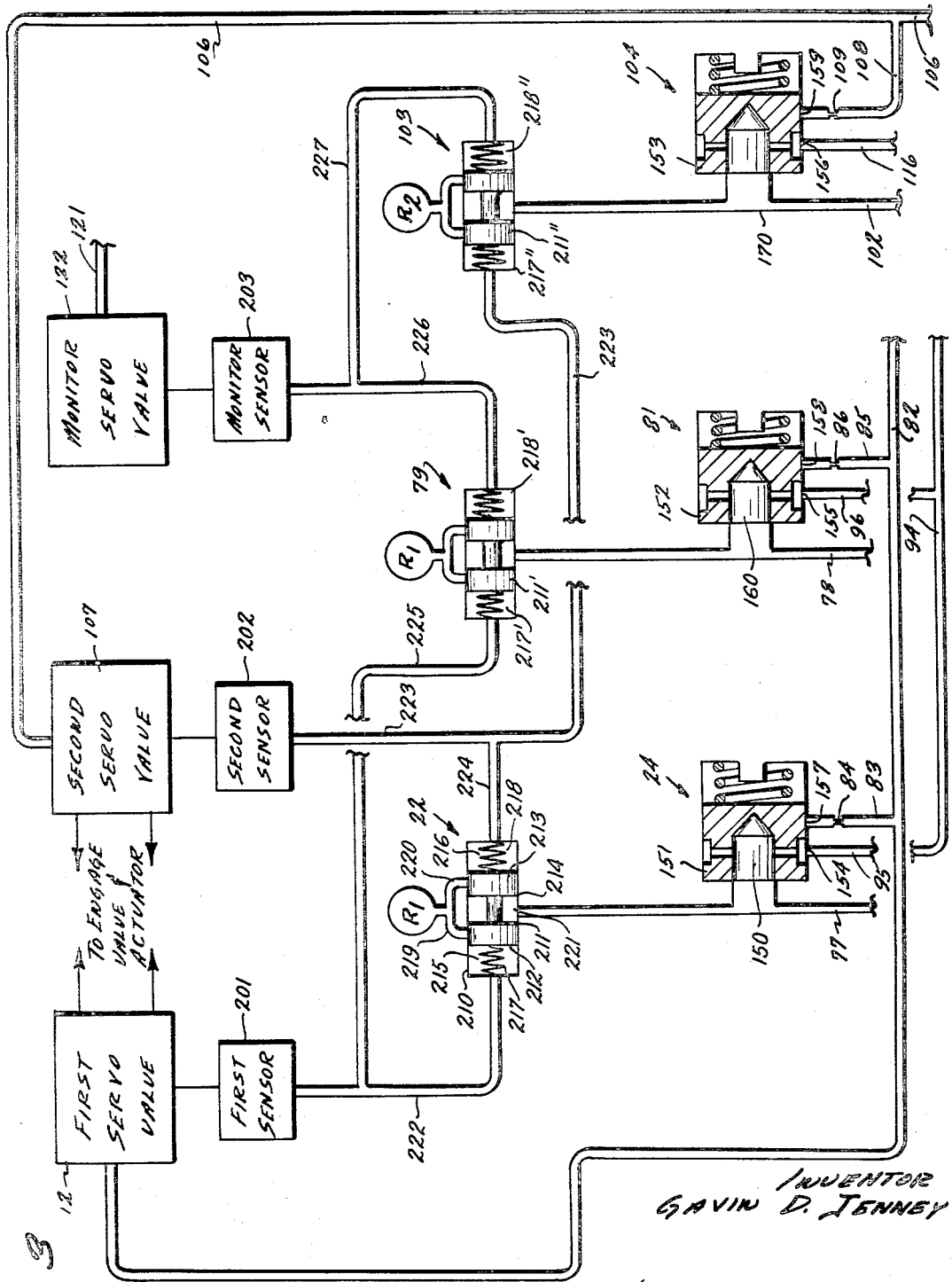

3,406,719

United States Patent Office

Patented Oct. 22, 1968

3,406,719
SEQUENTIAL ACTIVATING VALVE FOR REDUNDANT HYDRAERIC CONTROL SYSTEMS
Gavin D. Jenney, Arleta, Calif., assignor to Bell Aerospace Corporation, a corporation of Delaware
Filed Mar. 14, 1966, Ser. No. 533,914
8 Claims. (Cl. 137—596.16)

ABSTRACT OF THE DISCLOSURE

Disclosed is a specific activating valve apparatus for applying energizing fluid to a redundant control system in a controlled sequential manner. The redundant control system has a plurality of channels, each of the channels within the system includes (1) a control valve such as a servo valve applying fluid to an actuator, (2) sensor apparatus to generate servo valve operational status signals, and (3) operational status error detection and decision-making apparatus which is responsive to the generated signals from each of the channels and determines which channel is in error and effects switching to preclude further operation of that channel in the system. The activating valve is a slide valve disposed within a bore defining a plurality of input and output ports. The slide valve is activated by the application of fluid, upon operation of a solenoid valve, to the slide valve. The fluid is applied through a restriction orifice in a controlled manner to cause the slide valve to move at a predetermined rate of speed so as to sequentially open and close predetermined ones of the input and output ports, thereby conditioning the redundant control system for proper operation. The movement of the slide valve opens and closes the ports as above referred to in such a manner that the switching portion of the system is first reset and thereafter the error detection and servo valve portions of the system are energized to thereby preclude application of fluid to the actuator by a servo valve which is inoperative or has malfunctioned.

Background of the invention

This invention relates generally to redundant hydraeric control systems and more particularly to apparatus for activating such a system in a predetermined sequential manner to preclude false operation of the error-detection and shutoff portions of this system.

The term "hydraeric" are used throughout this specification and claims is intended to be generic to fluid under pressure and includes both hydraulics and pneumatics.

As is well known in the prior art, redundant control systems typically include a plurality of control channels interconnected from an input signal source to an output load which is controlled by the system. The control channels are operative in such a manner that in the event of a failure of one or more of the channels such failure is detected and a shutoff portion of the system is activated in order to deactivate the failed channel. In the event of a failure of a sufficient number of such plurality of control channels the control system typically switches to a manual mode of operation so that the failure detection portion of the system is de-energized. Such a prior art system is illustrated and described in U.S. Patent Nos. 3,338,138 and 3,338,139 and U.S. patent application, Ser. No. 481,-981, filed Aug. 23, 1965, which is assigned to the assignee of this application. Such systems are exemplary of a redundant control system with which the activation valve of the invention may be used.

Typically the error-detection and decision-making portion of such a redundant control system must first be placed in an operative position, i.e. reset, before the control system is energized. If such were not done an error may be indicated when in fact there is none.

Following operative positioning (resetting) of the error-detection and decision-making portion of the control system, the sequence of system energization depends upon the operational mission of the system. In those cases where system start-up occurs only when the overall apparatus with which the system is connected is first started, the subsequent sequence of energization is non-critical so long as the error-detection and decision-making portion is first reset. However, under those cases where the control system must be recycled during use, the energization sequence becomes quite critical. By the term recycling it is meant those situations where the error-detection and decision-making portions of the control system have, during use of the apparatus, detected what appears as failures and have de-energized selected control channels as a result thereof and the operator wishes to confirm the accuracy thereof. To do so the operator shuts down the entire control system and then reactivates the same during the time the apparatus under control continues to operate. For example, an aircraft during flight or, for example, if an apparatus is in use and a control channel has been de-energized because of a failure, it is never desirable to place this, in fact, failed channel in control, even momentarily, of the apparatus. Therefore, it becomes critical to energize the error-detection and decision-making portion (after resetting it) prior to energizing the control portions of the control system. Under those circumstances where a control channel has, in fact, failed, such failure is detected on system recycling and that failed channel de-energized prior to its assuming any control over the apparatus.

Accordingly, it is an object of the present invention to provide apparatus for permitting a redundant hydraeric control system to start up without inadvertently operating the error-detection and decision-making portion thereof.

It is another object of the present invention to provide apparatus for permitting a redundant hydraeric control system to be recycled in use without permitting a failed control channel incorporated therein to attempt to assume control over the load or the system.

It is a further object of the present invention to provide apparatus for permitting a redundant hydraeric control system to start up either initially or be recycled in use without false error-detection which is simple, rugged, positive in operation and is insensitive to adverse operating conditions.

It is yet another object of the present invention to provide apparatus for automatically resetting the failure-detection and shutoff portions of a hydraeric control system each time the system is initially set in operation or is recycled during use.

Brief description of the drawings

Other objects and advantages of the present invention will become apparent from a consideration of the following description taken in conjunction with the accompanying drawings which are presented by way of example only and illustrate one specific embodiment of an activating valve in accordance with the present invention, and is not intended as a limitation upon the present invention and, in which:

FIGURES 2 and 3 illustrate more in detail, but in schematic form, a system embodying activation valve means in accordance with the present invention.

Summary of the invention

A redundant hydraeric control system in which the activation valve in accordance with the present invention would be utilized would include a plurality of channels each having a servo valve, a sensor means, a logic means and a shutoff means, all operatively interconnected to detect a failed servo valve and disable the same. The activation valve means is utilized to energize the control system in a predetermined manner and includes first, second and third passageway means, each connected respectively to the shutoff, logic, and servo valve means. The valve means is cooperatively interconnected with each of the first, second and third passageway means to sequentially energize the system and is connected to an actuating means to cause actuation of the same. Upon actuation, the valve means first opens the first passageway means thereby to reset the shutoff means, and thereafter opens the second and third passageway means to energize the logic means and the servo valve means of the system.

Description of the invention

Figure 1:
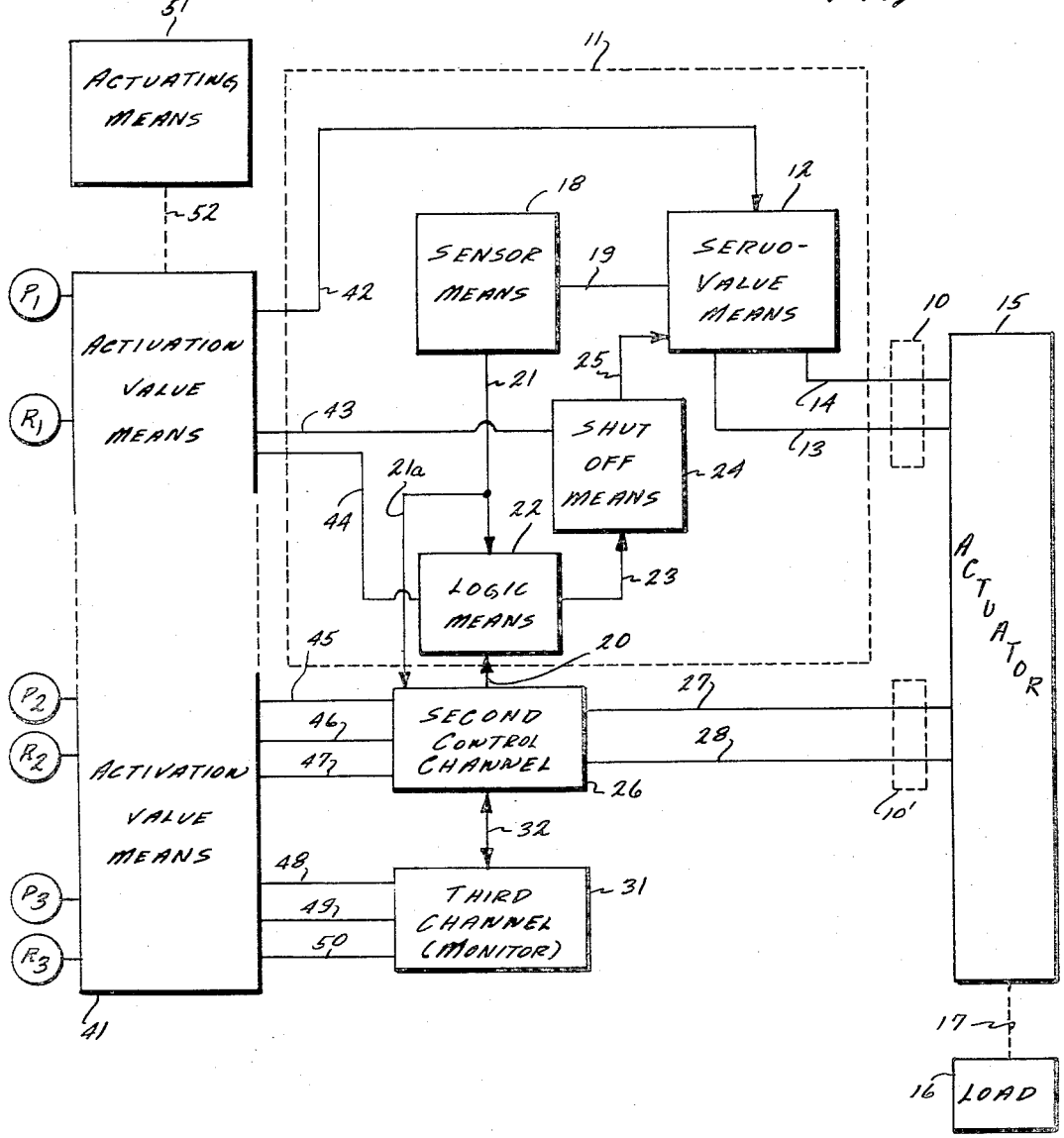
FIGURE 1 is a schematic diagram in block form of a system including activation valve means in accordance with the present invention.

Reference is now made to the drawings in which there is illustrated, more in detail, activation valve means in accordance with the present invention interconnected into a hydraeric redundant control system. As is shown in FIGURE 1, a hydraeric redundant control system includes three separate and distinct control channels. Each of these channels includes similar component parts but only the first control channel is illustrated in any detail in FIGURE 1. The first control channel shown within dashed line 11 includes, as part thereof, a servo valve means 12 which is connected by way of conduits 13 and 14 to an actuator 15. The actuator 15 is connected to a load 16 as is indicated by the dashed line 17, as is well known in the prior art. Movement of the actuator 15 in response to fluid flow from the servo valve means 12 causes positioning of the load in response to control signals applied to the servo valve. A sensor means 18 is connected by conduit 19 to the servo valve means 12 and is used to provide a signal which is indicative of the command signal generated by the servo valve means at any point in time. The output of the sensor means 18 is applied by a conduit 21 to a logic means 22 and by a conduit 21a to the second control channel 26. The logic means 22 receives the signals (as will be more fully explained below) from the sensor means 18 and compares it to the signals received, for example, through conduit 20, from other control channels to detect whether or not the various channels are operating in accordance with that which is desired in the particular control system.

In the event there is in fact a malfunction within a particular control channel of the system, such is detected by the logic means in such a manner as to determine which of the control channels has malfunctioned and to provide a signal indicative thereof. Such signal is then, for example, applied through lead 23 to a shutoff means 24. Shutoff means 24 activates and such activation is applied by way of conduit 25 back to the servo valve means 12 to disable the same assuming that it is the first control channel which has malfunctioned.

A similar control channel indicated as the second channel 26 is also connected by way of the conduits 27 and 28 to the actuator 15. Also there is provided a third channel 31 which in this instance is the monitor channel. As is illustrated there is an interconnection shown by the conduit 32 between the second and third channels which is included, as will be more fully shown hereinafter, in the logic means of the overall control system.

As is well known in the art, the first and second control channels 11 and 26 may operate on a force-sharing basis to control actuator 15, or alternatively the second channel may operate on a strict standby status, coming into actual active control of the actuator in the event only of a failure in the first channel 11. The third or monitor channel is used to provide a monitoring signal for purposes of enabling the decision-making portion of the apparatus to determine what section thereof has malfunctioned when such does in fact occur.

As was above pointed out in the utilization of such a control system as shown in FIGURE 1, it becomes extremely important to apply the hydraeric pressures and their respective returns to a system in a manner such that false indication of channel failure does not occur. Such is accomplished by utilization in the present invention of an activation valve means 41. As is illustrated three sources of pressure and their returns P1, P2, P3, and R1, R2, R3, respectively, are applied to the activation valve means. As is indicated by the conduits 42, 43 and 44 the first source of hydraeric pressure and its return, P1–R1, respectively, are applied to portions of the control channel 11. For example, the source of pressure P1 may be applied through the conduit 42 to the servo valve means 12, to the shutoff means 24 through the conduit 43, and to the logic means 22 through the conduit 44. Similarly the return may be applied through any one of these desired portions of the system depending upon the particular design thereof. Similarly, the pressure sources and returns are applied as is indicated by the conduits 45, 46 and 47 to the second control channel and by the conduits 48, 49 and 50 to the third or monitor channel. It should be understood that any particular pressure source or its return may be applied to any particluar portion of any of the control channels depending upon the particular design and desired sequence required thereby.

There is also provided an actuating means 51 which is connected as is illustated by the dashed line 52 to the activation valve means to cause the same to operate to thereby energize the redundant hydraeric control system.

Figure 2:
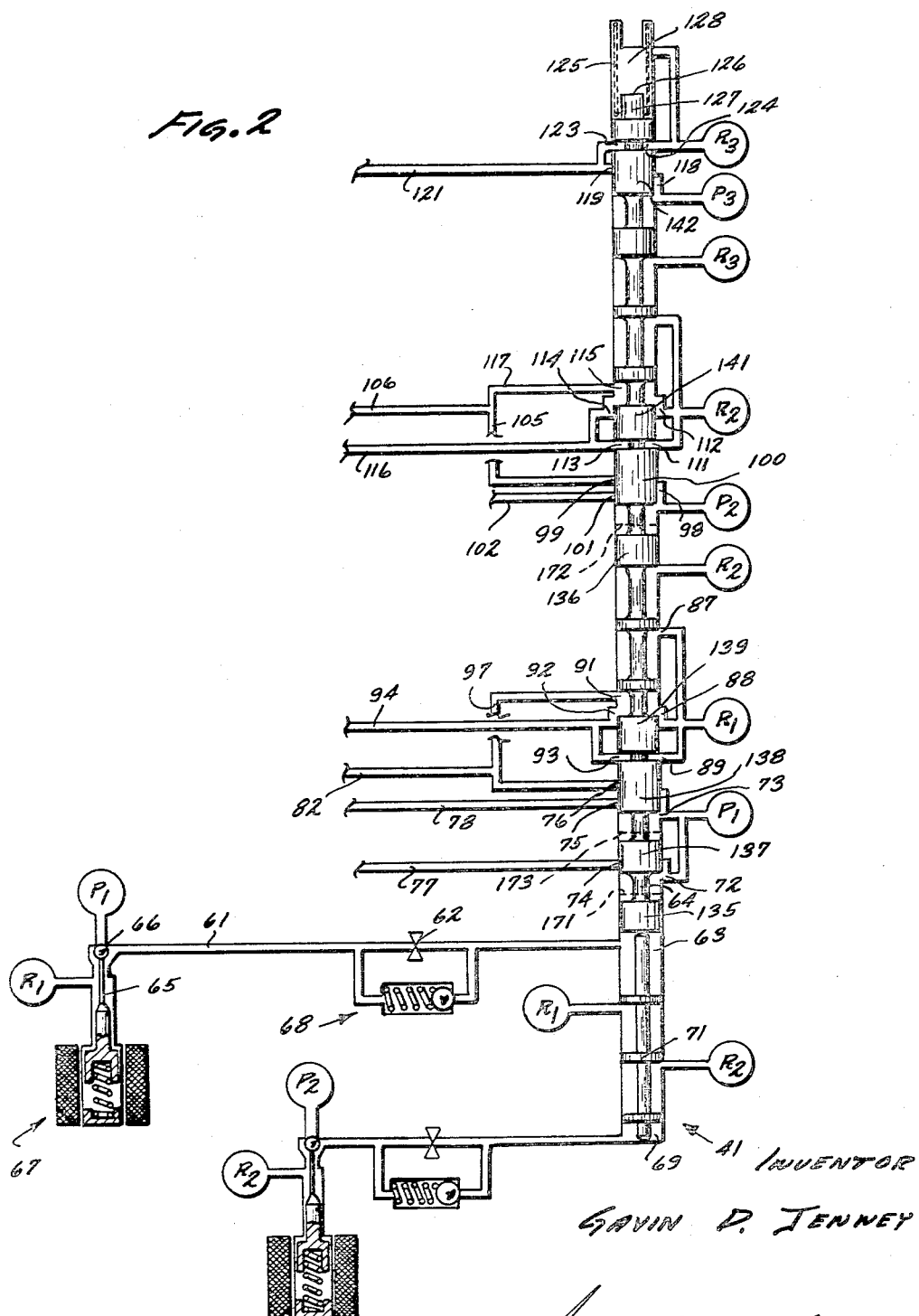

A more thorough understanding of the details of the hydraeric control system and the activation valve means can be obtained by reference to FIGURES 2 and 3. The apparatus illustrated in FIGURES 2 and 3 is designed for the special case wherein the servo valves may be turned on before the error detection and decision-making portion of the system is activated. Such a system could be utilized where recycling during use is desired by causing the activation valve means to translate sufficiently fast enough to preclude any failed unit from remaining active a deleterious period of time. However, such operation is not normally desirable and would only be used where a blocking valve is inserted between the output of the servo valves and the actuator and actuated only after the logic and shutoff means is energized. Such a blocking valve is shown at 10 and 10′ in FIGURE 1. The system as illustrated can be modified to have the servo valves and the error-detection and decision-making portion of the system energized at least simultaneously and such will be described below.

As is shown in FIGURES 2 and 3 the activation valve means 41 is actuated by application of hydraeric fluid thereto. It should be understood, however, that any means of actuation may be utilized which provides the desired delay and sequence of operation of the valve means 41. In the presently preferred embodiment, the source P1 of hydraeric fluid is applied through a conduit 61, through a restriction orifice 62, to a chamber 63 which causes a slide valve 64 to move upwardly as viewed in FIGURE 2, thus applying pressure and return to the overall system as will be more fully described hereinbelow. By utilization of the restriction orifice 62 the rate of flow from source P1 is controlled, thus controlling the rate at which the slide valve 64 moves within its chamber. By thus controlling the rate of movement of the slide valve 64 the sequential application of the pressure and return of each of the various sources thereof to various portions of the system is accomplished in a predetermined timed sequential manner. The pressure from source P1, however, is not applied to the conduit 61 until the valve 65 is withdrawn from its seat 66. This is accomplished upon the application of an electrical signal to the solenoid 67 which operates the valve 65. Until such is done the return R1 is applied to the system through the conduit 61.

It should be noted that a one-way valve in the form of a check valve 68 is placed in parallel with the restriction orifice 62. The check valve 68 is utilized to permit a fast return of the slide valve 64 in the event of a loss of pressure or electrical signal to the solenoid, that is, as the slide valve 64 returns downwardly as viewed in FIGURE 2, the hydraeric fluid in the chamber 63 travels through the check valve 68 unimpeded by the restriction orifice 62. However, since the check valve is spring loaded in a direction such as to preclude flow therethrough from the source P1 to the chamber 63, such flow must in that direction pass through the restriction orifice 62.

It should further be noted that a similar solenoid valve, restriction orifice and check valve assembly is utilized to apply pressure from the source P2 thereof to a chamber 69 at the lower end of a drive rod 71 which abuts the lower end of the slide valve 64. Thus the slide valve 64 is actuated and remains actuated so long as system source of pressure P1 or P2 is applied thereto. A loss of both sources of pressure P1 and P2 are necessary to cause the slide valve 64 to return to its shutoff position as illustrated in FIGURE 2.

Referring now more specifically to FIGURE 3, the error-detection and decision-making functions will become more apparent. The first, second and monitor servo valves 12, 107 and 122, respectively, may be of the type disclosed in U.S. Patents 2,947,285 and 2,947,286. The first, second and monitor sensors 201, 202 and 203, respectively, may be of the type illustrated in U.S. Patents 3,338,138 and 3,338,139. Thus, the servo valves receive substantially identical input signals which position a pilot valve so as to create a differential pressure signal which is applied across a power control valve. The power valve in turn controls the flow of fluid to the actuator. Positioning of the power control valve in each servo valve is sensed by the sensors 201, 202, and 203. In each case the sensor may be a nozzle having fluid flowing therethrough with a flapper positioned adjacent the nozzle orifice. Each flapper is affixed to a respective power control valve and moves relative to the nozzle orifice as the power control valve moves. As the flapper moves, the nozzle orifice is responsively restricted or opened thereby increasing or decreasing the pressure at the nozzle orifice position of the power control valve in each servo valve is generated by each sensor. So long as the system is operating normally each of these sensor signals is substantially identical. In the event of a malfunction or failure in one or more of the channels, the sensor signals will no longer be substantially identical.

To detect a failed channel, the sensor signals are connected to logic means. The term "logic" as used throughout this specification and the claims is intended to mean a comparison of the signals which are indicative of the operational status of each channel to detect a failure and to determine in which channel the failure has occurred. Logic means 22, 79 and 103 are used to accomplish the foregoing. In each instance sensor signals from two different sensor means are compared. Since each logic means is constructed similarly only logic means 22 will be described in any detail. Similar parts, referred to below, in logic means 79 and 103 will be designated by the same numbers primed or double primed, respectively.

Logic means 22 includes a cylinder 210 having a piston 211 slidably disposed therein. The piston 211 has lands 212 and 213 defining equal end areas interconnected by rod 214 and is centrally positioned by springs 215 and 216 to define end chambers 217 and 218. The cylinder 210 defines return ports 219 and 220 which during normal operation remain blocked by lands 212 and 213, respectively. The ports 219 and 220 are connected to return R1 as shown. The cylinder 210 also defines a port 221 to which is connected conduit 77. The sensor signal from the first sensor 201 is connected through conduit 222 to the chamber 217. The sensor signal from the second sensor 202 is connected through conduits 223 and 224 to chamber 218. The sensor signal from the first sensor is also connected through conduit 225 to chamber 217' of logic means 79 while the sensor signal from the second sensor 202 is connected through conduit 223 to chamber 217" of logic means 103. Similarly the sensor signal from the monitor sensor 203 is connected through conduits 226 and 227 to chambers 218' and 218" of logic means 79 and 103, respectively. Thus, logic means 22 compares the operational status of the first and second control channels by comparing the pressure signals generated by the first and second sensors. Similarly logic means 79 compares the first and third (monitor) channels and logic means 103 compares the second and third channels. If there is a discrepancy in the signals applied across any piston, it will translate and connect return to the appropriate conduits 77, 78 or 102. For example, if there is a failure in the first channel, the signal from the first sensor 201 will differ from the signals from the second and monitor sensors and pistons 211 and 211' will translate connecting return R1 to conduits 77 and 78. When conduits 77 and 78 are thus connected to return, orifice valves 151 and 152 immediately translate to the position shown in FIGURE 3. Such translation permanently connects return R1 from port 92 of the activation valve means 41 (FIGURE 2) through conduits 94, 95 and 96, and ports 154 and 155 of shutoff means 24 and 81, respectively, to conduits 77 and 78, respectively. Therefore, even though the pistons 211 and 211' return to their normal positions, return remains connected to conduits 77 and 78. Conduits 77 and 78 are connected to switching means or engage valve means (shown and described in Patents 3,338,138 and 3,338,139 and application S.N. 481,981 filed Aug. 23, 1965) which render the first channel inoperative and transfer control to the second channel. Thus, the logic means detected the failed channel and the shutoff means determines which channel should be rendered inoperative as a result thereof (i.e. the decision-making function). Similar functioning of the various parts above described occur in the event of a failure in the second or third channels, i.e. if the second channel fails, pistons 211 and 211" translate and orifice valves 151 and 153 translate; if the third channel fails, pistons 211' and 211" translate and orifice valves 152 and 153 translate.

Referring now specifically to the slide valve 64, source of hydraeric pressure P1 is applied to input ports 72 and 73. Output ports 74, 75 and 76 are associated with the source of pressure P1. However, in the deactivated position, as illustrated, each of these output ports is blocked by the lands 137 and 138 on the slide valve 64. The output port 74 is connected by conduit means 77 to the logic means 22 and the shutoff means 24 (FIGURE 3) of the first control channel, which means is described more in detail hereinafter. The output port 75 is connected by means of conduit 78 to the logic means 79 and the shutoff means 81 (FIGURE 3) while the output port 76 is connected by way of conduit 82 to the first servo valve means 12 (FIGURE 3). The conduit 82 is also connected by means of a conduit 83 through a restriction orifice 84 to the shutoff means 24 and by means of the conduit 85 and the restriction orifice 86 to the shutoff mean 81.

Progressing upwardly along the activation valve means 41 as illustrated in FIGURE 2, the return R1 is connected to return ports 87, 88 and 89 while output ports 91, 92 and 93 are associated therewith. In the shutdown or nonoperative position, as illustrated in FIGURE 2, each of the output ports 91, 92 and 93 are connected through the valve 64 to the return R1. The output ports 92 and 93 are connected by conduit 94 and conduit 95 (FIGURE 3) to the shutoff means 24 and by conduit 96 (FIGURE 3) to the shutoff means 81. The output port 91 is connected by the conduit 97 to the conduit 82. It should, therefore, be noted that during the time the output port 76 is blocked by the land 138 on the slide valve 64, the conduit 82 is connected to the return R1 through the output port 91 and conduit 97.

Progressing again upwardly along the valve 64, the hydraeric pressure source P2 is connected to input port 98 and is associated with output ports 99 and 101 which in the non-operative position of the slide valve 64 are closed by the land 100 thereof. The output port 101 is interconnected by the conduit 102 to the logic means 103 and the shutoff means 104 (FIGURE 3) while the output port 99 is connected by conduits 105–106 to the second servo valve 107 (FIGURE 3). Conduit 108 and restriction orifice 109 connects the conduit 106 to the shutoff means 104 (FIGURE 3).

The return R2 is connected to return ports 111 and 112 which are associated with output ports 113, 114 and 115. Output ports 113 and 114 are connected together and to the conduit 116. The conduit 116 is in turn connected to the shutoff means 104 (FIGURE 3). The output port 115 is connected by conduit 117 to the conduit 106 which as above pointed out is connected to the second servo valve 107.

The source of pressure P3 is connected to the input port 118 and is associated with the output port 119. The output port 119 is connected by means of conduit 121 to the monitor servo valve 122 (FIGURE 3). The output conduit 121 is also connected to an output port 123 which is associated with return R3 which is connected to the return port 124.

At the upper end of the slide valve 64 there is provided a spring means 125 which continuously urges the slide valve 64 in a downward direction. Upon operation of the solenoids controlling the application of hydraeric fluid from sources P2 and P1 to the lower end of the slide valve 64 the valve moves against the spring 125 until the surface 126 of the stop means 127 engages a stop member 128.

At this point the slide valve has translated through its entire stroke and has interconnected the various conduits with the various ones of the operational sections of the system. It is during this translation from the position shown in FIGURE 2 to being in contact with the stop member 128 that sequential activation of the control system occurs.

Operation

In the shutdown position as illustrated in FIGURE 2 all hydraeric fluid is removed from the system and hydraeric return is connected thereto. Upon translation of the slide valve 64 the error-detection and decision-making portion (logic and shutoff means) is first reset. Such is accomplished by lands 137 and 138 opening communication between source P1 and output ports 74 and 75 and by land 100 opening communication between source P2 and output port 101. Simultaneously lands 138 and 139 block return R1, lands 100 and 141 block return R2, and land 142 blocks return R3 from communication with the system. Thus hydraeric fluid is applied through conduits 77, 78 and 102 to shutoff means 24, 81 and 104 respectively (FIGURE 3). Such application of hydraeric fluid causes orifice pistons 151, 152 and 153 to translate to the right as viewed in FIGURE 3. Such translation closes ports 154, 155 and 156 and opens ports 157, 158 and 159.

After the error-detection and decision-making portion of the system has been reset the slide valve 64 continues to move upwardly and output ports 92 and 114 are again connected to returns R1 and R2 respectively by movement of lands 139 and 141. Thus return is connected to ports 154, 155 and 156 of shutoff means 24, 81 and 104 respectively. Simultaneously output ports 76, 99 and 119 are connected respectively to hydraeric sources P1, P2 and P3. Thus hydraeric fluid is applied to conduits 82, 106 and 121 to supply such fluid to servo valves 12, 107 and 122 (FIGURE 3). Conduits 83, 85 and 108 apply hydraeric fluid from sources P1 and P2 through restriction orifices 84, 86 and 109 and ports 157, 158 and 159 to the internal bores 150, 160 and 170 respectively provided in orifice valves 151, 152 and 153. Upon the application of the fluid in this manner the various portions of the system undergo their normal startup transients and quickly go to an operative status.

As the slide valve 41 abuts the stop 128 the system reaches its operative status. In this position output ports 74, 75 and 101 are blocked by lands 135, 137 and 136 respectively thus removing fluid sources P1 and P2 from conduits 77, 78 and 102 thereby precluding direct application of the fluid pressure to the internal bores 150, 160, 170 of the orifice valves. However, the orifice valves are maintained in their operative position by communication with the appropriate fluid source through the restriction orifices. The system is now fully energized and operative. The above operational sequence could have occurred either on initial startup or in use recycling.

It should be expressly understood that although the above description of operation is in detail, the entire translation of slide valve 64 occurs in 5 to 20 milliseconds.

Under the operative condition as above described the output of the sensors is applied to the logic means 22, 79 and 103 as illustrated. In the event of disagreement between the sensors, the logic means selectively connects return R1 or R2 to a predetermined combination of conduits 77, 78 and 102 which disables the failed channel as is well known.

Wherein it is necessary to energize the logic and shutoff means prior to or at least simultaneously with the energization of the servo valves such can be accomplished by relocating the leading edges of certain of the lands on the slide valve 64. For example the leading edges of lands 135, 136 and 137 would be moved as shown by dashed lines 171, 172 and 173 respectively. As thus shown, system pressure is removed from conduits 77, 78 and 102 simultaneously with application of system return to the shutoff means. Under these circumstances no failed servo valve could assume control and, therefore, such a feature would be incorporated in any system utilizing recycling during use.

There has thus been described apparatus for sequentially activating a hydraeric control system in a predetermined manner so as to first reset the error-detection and decision-making portion and thereafter to activate the remainder of the system which apparatus is rugged, positive in operation and precludes false operation of the error-detection portion of the system during startup or recycle.

What is claimed is:

1. In a redundant hydraeric control system including a plurality of channels each having a servo valve adapted to supply hydraeric fluid to an actuator in response to input signals applied to said servo valve, sensor means adapted to provide an information signal indicative of the operational status of said servo valve, logic means for receiving information signals to detect failure of a servo valve, and shutoff means operatively responsive to said logic means to disable a failed servo valve, activation valve means for energizing said control system in a predetermined manner comprising:

(a) first passageway means connected to said shutoff means;

(b) second passageway means connected to said logic means;

(c) third passageway means connected to a servo valve;

(d) valve means connected to each of said passageway means to sequentially energize said system;

(e) and actuating means connected to said valve means to actuate the same and upon actuation to (1) first open said first passageway means to reset said shutoff means, and (2) thereafter open said second and third passageway means to energize said logic means and said servo valve.

2. Activation valve means as defined in claim 1 which further includes blocking valve means disposed between said servo valves and said actuator, and being opened to permit flow therebetween only after said first, second, and third passageway means are opened.

3. Activation valve means as defined in claim 1 wherein said second passageway means is opened at least simultaneously with said third passageway means thereby to energize said logic means and said servo valve simultaneously to preclude a failed servo valve from attempting to supply hydraeric fluid to said actuator.

4. Activation valve means as defined in claim 1 wherein said valve means is an integral unitary member controlling all of said passageway means connected to all of said channels.

5. Activation valve means as defined in claim 1 wherein said valve means is a slide valve slidably disposed within a bore and said actuation means is a solenoid valve.

6. Activation valve means as defined in claim 5 wherein said solenoid valve means upon energization thereof applies hydraeric fluid to said valve means to cause the same to slide within said cylinder.

7. Activation valve means as defined in claim 6 wherein said bore defines at least 3 output ports and 2 input ports, said first, second and third passageway means being connected to said 3 output ports, a source of hydraeric fluid being connected to one of said input ports, and the return for said source being connected to the other input port.

8. Activation valve means as defined in claim 7 wherein said hydraeric fluid applied to said valve to cause said valve to slide is applied through restriction orifice means to control the rate of travel of said slide valve on energization of said system and which further includes bypass valve means connected in parallel with said restriction orifice and adapted to block flow therethrough when said system is being energized and to permit free flow therethrough when said system is being de-energized.

References Cited
UNITED STATES PATENTS 3,257,911   6/1966   Garnjost et al. _____ 91—48

HENRY T. KLINKSIEK, *Primary Examiner.*